UNITED STATES PATENT OFFICE.

CHARLES SORLEY, OF NEW YORK, N. Y., ASSIGNOR TO THE ANGLO-AMERICAN ELECTRIC LIGHT MANUFACTURING COMPANY, OF WEST VIRGINIA.

ELECTRODE FOR SECONDARY BATTERIES.

SPECIFICATION forming part of Letters Patent No. 419,728, dated January 21, 1890.

Application filed November 12, 1889. Serial No. 330,053. (No specimens.)

*To all whom it may concern:*

Be it known that I, CHARLES SORLEY, of the city, county, and State of New York, have invented a new and useful Improvement in Active Material for Storage-Battery Electrodes, of which the following is a specification.

My invention consists in a storage-battery-electrode plate, grid, or support, of any suitable material containing massicot as the active material.

It is a well-known fact that the active material in a storage-cell is subject to expansion and contraction during certain phases of the operation of the cell, and that the effect of this constant change of form of active material is greatly to reduce the effective life-time of the elements. When the active material is placed in the openings or interstices of an otherwise solid plate, the effect of its expansion is either to deform the plate or else to tear it. On the other hand, in contracting, the active material is apt to become loosened and fall out of the cavities in which it is packed, and this is especially the case after previous expansion. The result is that the plate either disintegrates or at best buckles or bends, so that when several plates are disposed in close proximity in the cell this bending or change of form may easily result in contact and short-circuiting between them. Various attempts have been made to overcome these difficulties by special construction of the supporting bodies or plates of electrodes, notably by the formation of apertures essentially of different shapes, in arrangement, and by making the plates of alloys and materials compounded with lead or other than lead, with the object of getting increased strength and augmented surface.

Of the various active materials used in the cell the oxides of lead are the most common.

There are five known lead oxides, as follows: lead suboxide, ($Pb_2O$,) lead monoxide, (PbO,) lead sesquioxide, ($Pb_2O_3$,) triplumbic tetroxide, ($Pb_3O_4$,) and lead dioxide, ($PbO_2$.)

Of these five oxides, monoxide, tetroxide, and dioxide, or, as more commonly called, "litharge," "minium," or "red lead," and lead peroxide, or brown oxide of lead, have all been used as active material in the storage-battery; but, as is well known, there are two forms of lead monoxide, one being known as "massicot," and produced by the oxidation of metallic lead in a current of air, and the other a substance yielding on fusion a crystalline mass, and produced by the oxidation of metallic lead at a higher temperature than that which is required for the manufacture of massicot. This last is litharge. So far as is known massicot has not been employed as an active material in the storage-battery, and in fact it finds but very few uses in the arts. It appears, however, that when massicot is used as such active material it possesses properties different from any other lead oxide or form thereof, and in fact from any other and different material employed for the same purpose. It has been found that if two plates of like construction are packed, the one with massicot and the other with litharge, for example, the plate packed with massicot will not undergo deformation in the cell, while the plate packed with litharge, under similar conditions, will be more or less distorted. The bodies of massicot still remain firmly coherent in the plate under conditions when like bodies of litharge or lead peroxide will loosen and fall out. It appears, moreover, from experiment that massicot has in the storage-cell a rate of expansion and construction very closely approximating to, if not the same as, that of lead itself, and hence when massicot is placed in a lead plate both the lead and the active material apparently expand and contract coincidently, and therefore maintain their relative relations in point of volume, and hence do not tend to separate or disintegrate. The massicot may be applied to the plate in any desired way—that is, it may be packed therein dry under pressure, or it may be made into a pasty mass and then inserted. It materially increases the storage capacity of the cell.

I claim—

1. In a storage-battery electrode, an active material consisting of massicot, substantially as described.

2. In a storage-battery electrode, a support of lead or lead alloy and an active material consisting of massicot applied thereto, substantially as described.

CHARLES SORLEY.

Witnesses:
S. O. EDMONDS,
PARK BENJAMIN.